United States Patent
Jan et al.

(10) Patent No.: US 9,565,268 B2
(45) Date of Patent: Feb. 7, 2017

(54) NETWORK STORAGE SYSTEM AND METHOD FOR FILE CACHING

(71) Applicant: Acer Incorporated, New Taipei (TW)

(72) Inventors: Ren-Jung Jan, New Taipei (TW); Yin-Hsong Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 425 days.

(21) Appl. No.: 14/324,080

(22) Filed: Jul. 4, 2014

(65) Prior Publication Data
US 2015/0095442 A1    Apr. 2, 2015

(30) Foreign Application Priority Data
Sep. 27, 2013 (TW) .............................. 102135029 A

(51) Int. Cl.
| G06F 15/167 | (2006.01) |
| H04L 29/08 | (2006.01) |
| G06F 12/08 | (2016.01) |
| G06F 12/12 | (2016.01) |

(52) U.S. Cl.
CPC ....... *H04L 67/2842* (2013.01); *G06F 12/0813* (2013.01); *G06F 12/123* (2013.01)

(58) Field of Classification Search
USPC .. 709/203, 212, 217, 219; 711/130, 137; 1/1
See application file for complete search history.

(56) References Cited

U.S. PATENT DOCUMENTS

| 5,805,809 | A  | * | 9/1998  | Singh ................. G06F 12/0813 709/217 |
| 5,881,229 | A  | * | 3/1999  | Singh ................. G06F 12/0813 709/203 |
| 5,983,324 | A  | * | 11/1999 | Ukai .................. G06F 12/0862 711/137 |
| 6,029,175 | A  | * | 2/2000  | Chow ............... G06F 17/30899 |
| 6,691,177 | B2 | * | 2/2004  | Utsunomiya ......... G06F 3/0601 709/217 |
| 7,802,065 | B1 | * | 9/2010  | Eatough ............. G06F 12/0813 711/130 |
| 8,069,225 | B2 | * | 11/2011 | McCanne ............... H04L 41/12 709/219 |
| 9,253,166 | B2 | * | 2/2016  | Gauda ................. G06F 21/6218 |
| 2008/0281908 | A1 | * | 11/2008 | McCanne ......... G06F 17/30156 709/203 |
| 2015/0095442 | A1 | * | 4/2015  | Jan ..................... H04L 67/2842 709/212 |

* cited by examiner

*Primary Examiner* — Quang N Nguyen
(74) *Attorney, Agent, or Firm* — Jianq Chyun IP Office

(57) ABSTRACT

A network storage system and a method for file caching are provided. The network storage system includes a first electronic apparatus and a server. The first electronic apparatus has a first storage space. The server has a network storage space larger than the first storage space. When the first electronic apparatus sends an access request to the server for accessing a first file within the network storage space, the server broadcasts a cache list in response to the access request. The cache list includes the first file and a plurality of neighboring file neighboring to the first file. After receiving the cache list, the first electronic apparatus accesses the first file according to the cache list, and caches at least one of the neighboring files according to a first cache space size of the first storage space.

12 Claims, 3 Drawing Sheets

NETWORK STORAGE SYSTEM AND METHOD FOR FILE CACHING

CROSS-REFERENCE TO RELATED APPLICATION

This application claims the priority benefit of Taiwan application serial no. 102135029, filed on Sep. 27, 2013. The entirety of the above-mentioned patent application is hereby incorporated by reference herein and made a part of this specification.

BACKGROUND

Field of the Invention

The invention is related to a storage system and a caching method and more particularly, to a network storage system and a method for file caching.

Description of Related Art

With the progress of technologies, network storage space sizes that can be provided to different users by servers (e.g., cloud servers, network drives, personal cloud server and so on) have been increasingly large (e.g., 2 TB) and even have been much larger than storage space sizes (e.g., 32 GB through 1 TB) of normal electronic apparatuses (e.g., smart phones, personal computers (PCs), tablet PCs, notebook PCs and so on). In this situation, when a user wants to access files in the aforementioned network storage space through a normal electronic apparatus to perform offline operations, the user generally has to set the files to be accessed offline manually since all the files in the network storage space are incapable of being copied in to the electronic apparatus (due to the electronic apparatus probably having an insufficient storage space for storing all the files of the network storage space).

As a result, the electronic apparatus may be capable of caching corresponding files according to the user's setting, such that the user may still be able to edit the files when the electronic apparatus is not connected with the server (i.e., offline). Even though the electronic apparatus may additionally capture other files that are stored in the network storage space utilizing a caching mechanism, the files cached by the electronic apparatus may probably be insufficient for the offline operations of the user because the conventional caching mechanism is not designed according to file usage requirements of the user. In other words, the typical electronic apparatuses and servers are incapable of automatically providing the user with a useful offline operation mode.

Moreover, the conventional caching mechanism is only present in an electronic apparatus that is currently being used by the user. Therefore, when the user wants to perform offline operations on another electronic apparatus, the other electronic apparatus may not have the latest versions of the files, and as a result, the user may probably be unable to perform offline operations.

SUMMARY

Accordingly, the invention provides a network storage system and a method for file caching, by which an electronic apparatus is allowed to selectively cache specific files according to the file usage requirements of a user in case a server of the network storage space has a storage space larger than that of the electronic apparatus, such that the user does not have to manually set files for being executed offline, but still can perform operations offline successfully.

The invention provides a network storage system including a first electronic apparatus and a server. The first electronic apparatus has a first storage space. The server is connected with the first electronic apparatus and has a network storage space larger than the first storage space. When the first electronic apparatus sends an access request to the server for accessing a first file within the network storage space, the server broadcasts a cache list in response to the access request. The cache list includes the first file and a plurality of neighboring files neighboring to the first file. After receiving the cache list, the first electronic apparatus accesses the first file according to the cache list and accesses at least one of the neighboring files according to a first cache space size of the first storage space.

The invention provides a method for file caching, which is adapted to a network storage system including a first electronic apparatus and a server. The first electronic apparatus has a first storage space, and the server has a network storage space. The method includes the following steps. When the first electronic apparatus sends an access request to the server for accessing a first file within the network storage space, the server broadcasts a cache list in response to the access request. The cache list includes the first file and a plurality of neighboring files neighboring to the first file. After receiving the cache list, the first electronic apparatus accesses the first file according to the cache list. The first electronic apparatus caches at least one of the neighboring files according to a first cache space size of the first storage space.

The invention provides a network storage system including a first electronic apparatus, a second electronic apparatus and a server. The first electronic apparatus has a first storage space and updates a file usage according to individual usage of a plurality of files in the first storage space. The second electronic apparatus has a second storage space. The server is connected with the first electronic apparatus and the second electronic apparatus. The server has a network storage space which is larger than the first storage space and larger than the second storage space and has a global cache list. When updating the file usage log, the first electronic apparatus sends a notification message to the server. After receiving the notification message, the server updates the global cache list and a plurality of server files associated with the file usage log according to the updated file usage log and broadcasts a cache synchronization notification. After receiving the cache synchronization notification, the second electronic apparatus accesses the global cache list of the server and caches the plurality of server files of the server according to the global cache list.

The invention provides a method for file caching, which is adapted to a network storage system including a first electronic apparatus, a second electronic apparatus and a server. The method includes the following steps. The first electronic apparatus updates a file usage log according to individual usage of a plurality of files in the first storage space. When updating the file usage log, the first electronic apparatus sends a notification message to the server. After receiving the notification message, the server updates the global cache list and a plurality of server files associated with the file usage log according to the updated file usage log and broadcasts a cache synchronization notification. After receiving the cache synchronization notification, the second electronic apparatus accesses the global cache list of the server and caches the plurality of server files of the server according to the global cache list.

To sum up, by the network storage system and the method for file caching provided by the invention, the first electronic apparatus may additionally access neighboring files neighboring to the files to be accessed according to the cache list broadcasted by the server.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
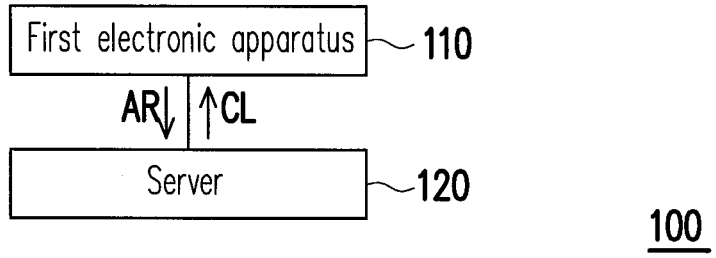
FIG. 1 is a schematic diagram of a network storage system according to an embodiment of the invention.

FIG. 1 is a schematic diagram of a network storage system according to an embodiment of the invention. In the present embodiment, a network storage system 100 includes a first electronic apparatus 110 and a server 120. The first electronic apparatus 110 has a first storage space. The first electronic apparatus 110 is, for example, an electronic apparatus capable of accessing and editing files stored in a server 120, such as a mobile phone, a smart phone, a personal computer (PC), a notebook PC, a netbook PC, a tablet PC, a game console, a portable apparatus, a portable multimedia player, but the invention is not limited thereto. The server 120 is connected with the first electronic apparatus 110. The server 120 is, for example, a server that allows the first electronic apparatus 110 to access the stored files through a network (e.g., an Ethernet, a wireless network, a mobile network and the like), such as a cloud server and/or a network drive.

The server 120 may include a network storage space (e.g., a personal cloud server) that is dedicated to a single user. In such scenario, the user may log in the network storage space dedicated to the user in the server 120 on different electronic apparatuses using the same username and password so as to perform operations, such as accessing, editing, deleting, changing, modifying and storing files, in the dedicated network storage space. The network storage space may be larger than the first storage space of the first electronic apparatus 110, but the invention is not limited thereto.

Figure 2:
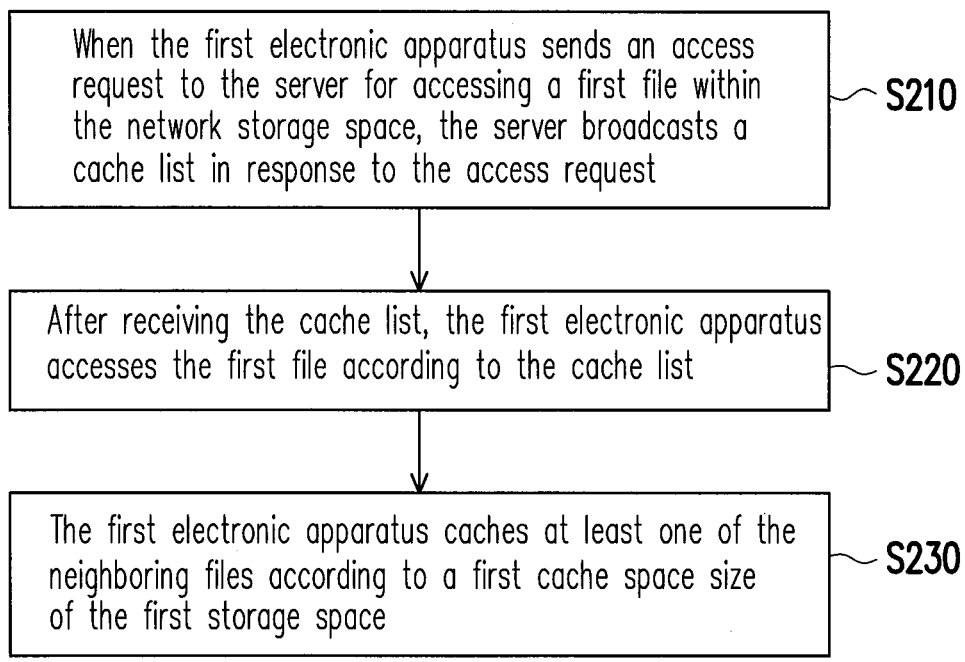
FIG. 2 is a flowchart of a method for file caching according to an embodiment of the invention.

FIG. 2 is a flowchart of a method for file caching according to an embodiment of the invention. The method of the present embodiment may be executed by each apparatus depicted in FIG. 1, and steps of the method will be described with reference to each apparatus of FIG. 1.

In step S210, when the first electronic apparatus 110 sends an access request AR to the server 120 for accessing a first file within the network storage space, the server 120 broadcasts a cache list CL in response to the access request AR.

The cache list CL is, for example, a list of files that the server 120 notifies the first electronic apparatus 110 to capture. The cache list CL may include, for example, the first file and a plurality of neighboring files neighboring to the first file. Specifically, each of the neighboring files may have a modified time and/or a storage position that is neighboring/close to the first file.

For instance, when a modification time difference between a certain file and the first file is less than a predetermined threshold (e.g., a day), the file may be considered as having a modified time that is neighboring/close to the first file, and the server 120 may define the file as a neighboring file of the first file. Namely, if a difference between the modified time (i.e., a time point when the file is latest edited) of the file and the modified time of the first file is within the predetermined threshold (e.g., a day), the server 120 defines the file as a neighboring file of the first file and includes the file in the cache list CL. It should be understood by persons having ordinary skill in the art that the predetermined threshold may be adjusted as any other length of time (e.g., hours, minutes or seconds) by a designer according to his/her design requirements.

For another example, when a certain file and the first file belong the same directory, the same path and/or the same folder, the file may be considered as having a storage position that is neighboring/close to the first file, and the server 120 may define the file as a neighboring file of the first file. Namely, the server 120 may consider the all files having the same directory, the same path and the same folder like the first file does as neighboring files of the first file. Therefore, when the server 120 receives the access request AR, the server 120 may include the files having the same directory, the same path and the same folder like the first file does in the cache list CL.

Then, in step S220, after receiving the cache list CL, the first electronic apparatus 110 may access the first file according to the cache list CL. Meanwhile, in step S230, the first electronic apparatus 110 may cache at least one of the neighboring files according to a first cache space size of the first storage space. For instance, if it is assumed that a sum of sizes of all files in the cache list CL is 1600 MB, while the first cache space size of the first electronic apparatus 110 is 500 MB, the first electronic apparatus 110 may cache only 500 MB of said 1600 MB when the receiving the cache list CL.

That is, the first electronic apparatus 110 not only accesses the first file that is about to be accessed but also cache several neighboring files included in the cache list CL according to the first cache space size. In detail, a sum of sizes of the neighboring files may be over the first cache space size of the first electronic apparatus 110, such that the first electronic apparatus 110 may cache the neighboring files in the cache list CL as many as possible according to its cache capability.

In this case, the first electronic apparatus 110 adaptively caches several neighboring files according to the file usage requirements of the user, and thus, when being disconnected from the server 120 (i.e., offline), the first electronic apparatus 110 still may provide sufficient files to be executed by the user offline. In other words, when the user desires to perform offline operations on the first electronic apparatus 110, he/she does not have to manually set the files to be executed offline.

In other embodiments, since the user may use accesses the network storage space of the server 120 using a second electronic apparatus, the invention further provides a network storage system and a method for file caching according to another embodiment, in which the user may simultaneously control the second electronic apparatus to cache files to the second electronic apparatus according to the file usage requirements of the user while accessing the server 120 using the first electronic apparatus 110. By doing so, when the user performs offline operations using the second electronic apparatus, the second electronic apparatus may also sufficient files to be executed by the user offline. Description of the network storage system and the method for file caching will be set forth with reference to FIG. 3 and FIG. 4.

Figure 3:
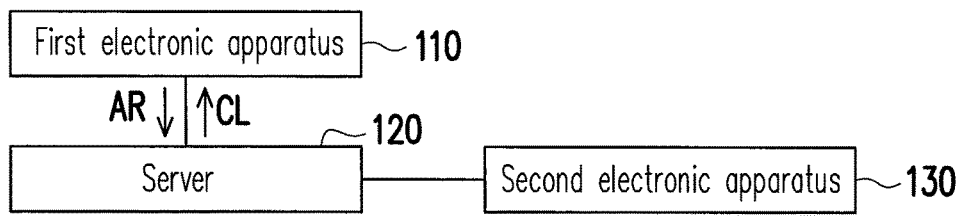
FIG. 3 is a schematic diagram of a network storage system according to an embodiment of the invention.

FIG. 3 is a schematic diagram of a network storage system according to an embodiment of the invention. A network storage system 300 of the present embodiment further includes a second electronic apparatus 130 in addition to the first electronic apparatus 110 and the server 120 which are illustrated in FIG. 1. The second electronic apparatus 130 has a second storage space smaller than the network storage space of the server 120. The second electronic apparatus 130 is connected with the server 120. The second electronic apparatus 130 is, for example, an electronic apparatus capable of accessing and editing files stored in the server 120, such as a mobile phone, a smart phone, a personal computer (PC), a notebook PC, a netbook PC, a tablet PC, a game console, a portable apparatus, a portable multimedia player, but the invention is not limited thereto. In the present embodiment, the user may log in the network storage space dedicated to the user in the server 120 respectively on the first electronic apparatus 110 and the second electronic apparatus 130 using the same username and password so as to perform operations, such as accessing, editing, deleting, changing, modifying and storing files, in the dedicated network storage space.

Figure 4:
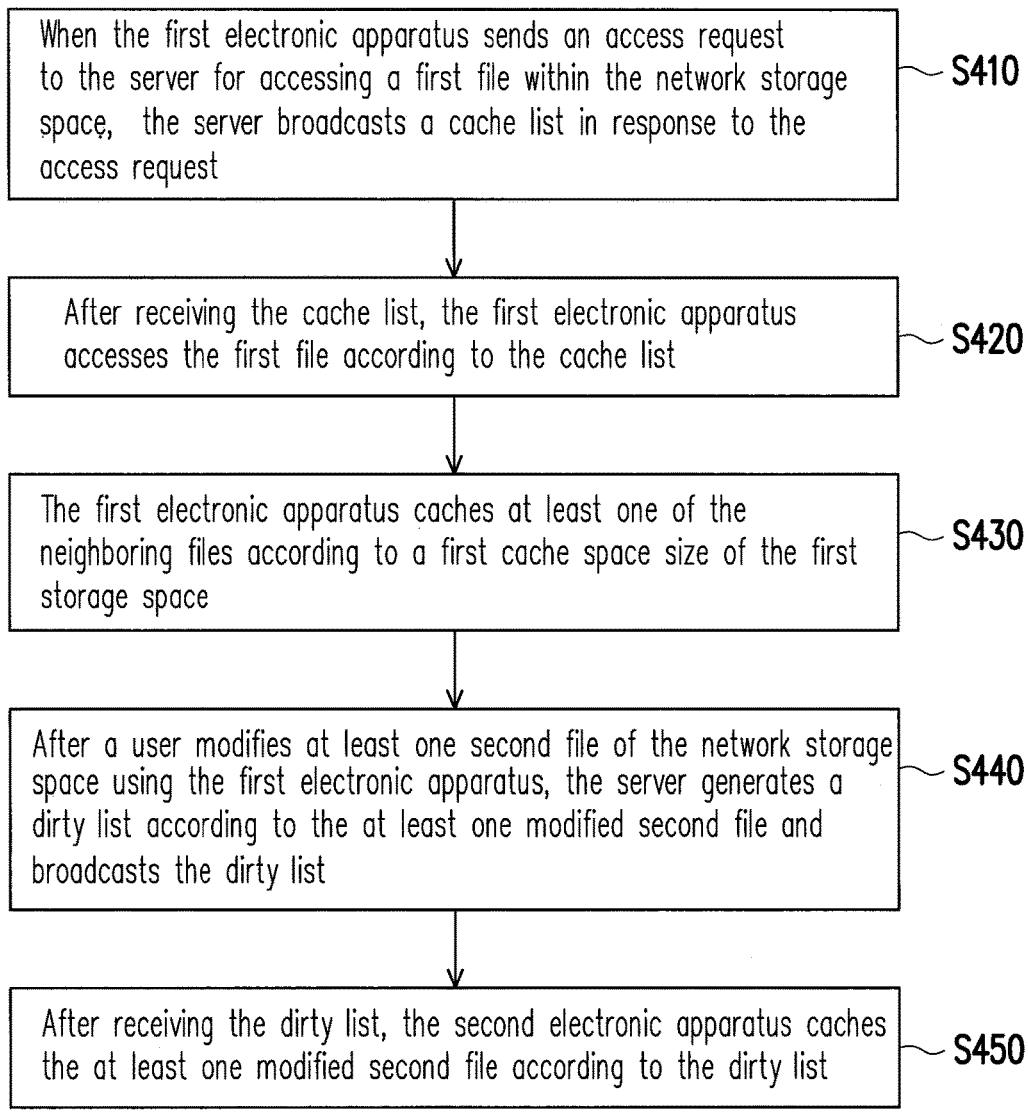
FIG. 4 is a flowchart of a method for file caching according to an embodiment of the invention.

FIG. 4 is a flowchart of a method for file caching according to an embodiment of the invention. The method of the present embodiment may be executed by each apparatus depicted in FIG. 3, and steps of the method will be described with reference to each apparatus of FIG. 3. In the present embodiment, steps S410 through S430 are the same as step S210 through S230 of the embodiment illustrated in FIG. 1, of which details may refer to the teaching of the embodiments above and will not repeatedly described hereinafter.

It should be noted that after step S410, the second electronic apparatus 120 may also directly receive the cache list CL broadcasted by the server. Then, the second electronic apparatus 120 may access the first file according to the cache list CL. Meanwhile, the second electronic apparatus 120 may also cache at least one of the neighboring files according to a second cache space size of the second storage space thereof. For instance, if it is assumed that the sum of sizes of all the files in the cache list CL is 1600 MB, while the second cache space size of the second electronic apparatus 130 is 800 MB, the second electronic apparatus 130 may cache only 800 MB of said 1600 MB when the receiving the cache list CL.

In step S440, after the user modifies at least one second file within the network storage space using the first electronic apparatus 110, the server 120 may generate a dirty list according to the at least one modified second file and broadcasts the dirty list. Afterwards, in step S450, after receiving the dirty list, the second electronic apparatus 130 may cache the at least one modified according to the dirty list. In other words, when the user accesses or modifies the second files on the server 120 using the first electronic apparatus 110, the server 120 may include the modified second files in the dirty list so as to notify other electronic apparatuses (e.g., the second electronic apparatus 130) of the user to cache the second files. After receiving the dirty list broadcasted by the server 120, the second electronic apparatus 130 may update or capture a plurality of second files correspondingly according to the dirty list. By doing so, even though the user does not access the files on the server 120 using the second electronic apparatus 130, the second electronic apparatus 130 still provides sufficient files to be executed by the user offline when the user desires to perform offline operations using the second electronic apparatus 130.

Additionally, even though only the second electronic apparatus is illustrated as an example in the embodiments illustrated in FIG. 3 and FIG. 4, those having ordinary skill in the art should understand that the method provided by the invention may also be applicable to a network storage system having more electronic apparatuses. To be more specific, as long as the electronic apparatuses may log in the network storage space on the server 120 using the same username and password like the first electronic apparatus 110 does, the server 110 may broadcast the cache list CL and the dirty list to the electronic apparatuses. The operations of the electronic apparatuses after receiving the cache list CL and the dirty list are the same like the second electronic apparatus 130 does and will not be repeatedly described hereinafter. By doing so, even though the user does not access the files on the server 120 using the electronic apparatuses, the electronic apparatuses still can provide sufficient files to be executed by the user offline when the user desires to perform offline operations using the electronic apparatuses.

Figure 5:
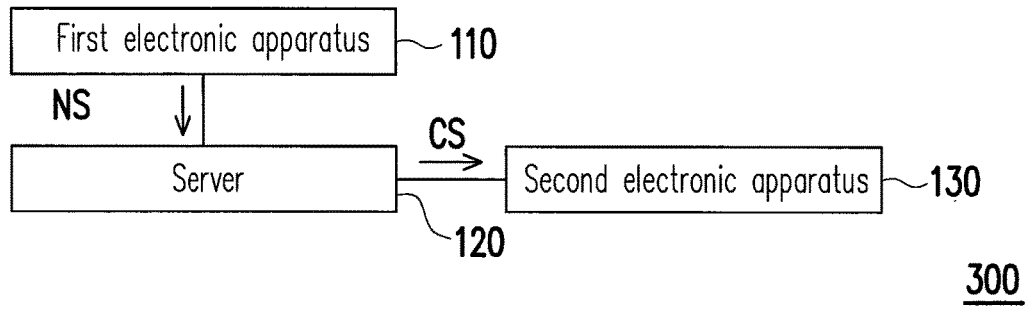
FIG. 5 is a schematic diagram of a network storage system according to an embodiment of the invention.
Figure 6:
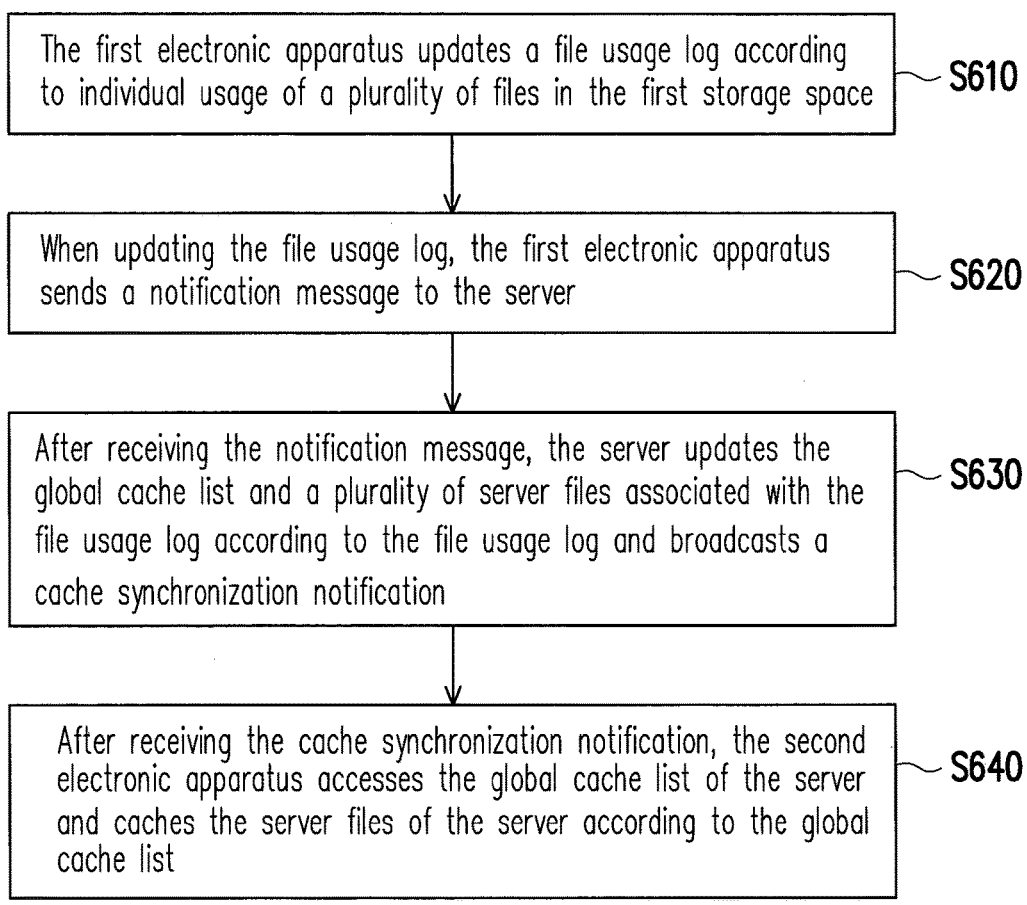
FIG. 6 is a flowchart of a method for file caching according to an embodiment of the invention.

FIG. 5 is a schematic diagram of a network storage system according to an embodiment of the invention. FIG. 6 is a flowchart of a method for file caching according to an embodiment of the invention. The method illustrated in FIG. 6 may be executed by each apparatus depicted in FIG. 5, and steps of the method of FIG. 6 will be described with reference to each apparatus of FIG. 5.

In step S610, the first electronic apparatus 110 updates a file usage log according to individual usage of a plurality of files within the each first storage space on the first electronic apparatus 110. The file usage log may be used to record, for example, information, such as a modified time and a size, of each file edited by the user on the first electronic apparatus 110, but the implementation of the invention is not limited thereto. For instance, when the user edits a certain file using the first electronic apparatus 110, the electronic apparatus 110 may correspondingly update information such as a modified time of the file in the file usage log. In other words, the file usage log may be used to record a plurality of most recently used (MRU) files of the user.

Thereafter, in step S620, when updating the file usage log, the first electronic apparatus 110 may send a notification message NS to the server 120. And, in step S630, after receiving the notification message NS, the server 120 may update a global cache list and a plurality of server files associated with the file usage log according to the updated file usage log and broadcast a cache synchronization notification CS. The global cache list is, for example, a specific cache list maintained by the server 120 and used for allowing all the electronic apparatuses (e.g., the first electronic apparatus 110 and the second electronic apparatus 130) connected with the server 120 to know which files have priority for being cached.

In an embodiment, the server 120 may adjust a sorting order of the MRU files in the global cache list according to an individual modified time of each of the MRU files in the file usage log. Specifically, the server 120 may sort each of the MRU files that has the latest modified time in the front of the global cache list. In other words, MRU files having the later modified time have the higher priority than those having the earlier modified time. Additionally, the server 120 may simultaneously capture files that are recorded in the file usage log from the first electronic apparatus 110 to store the captured files as the server files.

Afterwards, in step S640 after receiving cache synchronization notification CS, the second electronic apparatus 130 may access the global cache list of the server 120 and cache a plurality of server files of the server 120 according to the global cache list.

In an embodiment, the second electronic apparatus 130 may preferentially cache the MRU files having the higher priority in the global cache list. Additionally, in other embodiments, the second electronic apparatus 130 may cache a part of the server files in the global cache list according to a cache space size of the second storage space. Details of such implementation may refer to the teaching in the embodiments above and will be no longer repeatedly described.

From another perspective, due to the network storage space of the server 120 being larger than the first storage space of the first electronic apparatus 110 and the second storage space of the second electronic apparatus 130 respectively, the first electronic apparatus 110 and the second electronic apparatus 130 cannot cache all the files of the server 120, as what has been taught in the embodiments above. However, when the global cache list is configured in the server 120, the first electronic apparatus 110 and the second electronic apparatus 120 may have the priority to cache the files that are edited by the user lately. By doing so, when the user desires to use the lately edited files on different electronic apparatuses, the user does not have to additionally set but still may use the latest files on the electronic apparatuses since all the electronic apparatuses cache the lately edited files according to the global cache list. In other words, in such file caching mechanism, the user is prevented from caching same files having different contents due to using different electronic apparatuses for caching.

Based on the above, in the network storage systems and the methods for file caching provided by the invention, the first electronic apparatus can selectively cache specific files according to the file usage requirements of the user, such that the user can successfully perform offline operations, without manually setting the files to be executed offline. To be more specific, the first electronic apparatus can additionally cache the neighboring files neighboring to the files that will be accessed according to the cache list broadcasted by the server. In this situation, since the first electronic apparatus has adaptively cached several neighboring files according to the files usage requirements of the user, the first electronic apparatus still can provide sufficient files to be executed by the user offline when the first electronic apparatus is disconnected (i.e., offline) from the server. Moreover, since the storage space of the first electronic apparatus may be smaller than the network storage space of the server, the first electronic apparatus of the invention may further cache the neighboring files in the cache list as many as possible according to its own caching capability (e.g., cache space size).

Furthermore, when the user edits a certain file on the server using the first electronic apparatus, the server can simultaneously notifies the second electronic apparatus of which files that are modified, such that the second electronic apparatus can cache the modified files. By doing so, even though the user never caches the files of the server using the second electronic apparatus, the second electronic apparatus still can provides sufficient files to be executed by the user offline when the user desires to perform offline operations using the second electronic apparatus.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A network storage system, comprising:
a first electronic apparatus, having a first storage space;
a server, connected with the first electronic apparatus and having a network storage space larger than the first storage space, wherein
when the first electronic apparatus sends an access request to the server for accessing a first file within the network storage space, the server broadcasts a cache list in response to the access request, wherein the cache list comprises the first file and a plurality of neighboring files neighboring to the first file, and
after receiving the cache list, the first electronic apparatus accesses the first file according to the cache list and accesses at least one of the plurality of neighboring files according to a first cache space size of the first storage space; and
a second electronic apparatus, connected with the server and having a second storage space smaller than the network storage space,
wherein after receiving the cache list, the second electronic apparatus accesses the first file according to the cache list and accesses at least one of the neighboring files according to a second cache space size of the second storage space,
wherein after a user modifies at least one second file of the network storage space using the first electronic apparatus, the server generates a dirty list according to the at least one modified second file and broadcasts the dirty list, and
after receiving the dirty list, the second electronic apparatus caches the at least one modified second file according to the dirty list.

2. The network storage system according to claim 1, wherein
the plurality of neighboring files and the first file belong to a same directory, a same path and/or a same folder.

3. The network storage system according to claim 1, wherein
a modification time difference between each of the neighboring files and the first file is less than a predetermined threshold.

4. The network storage system according to claim 1, wherein the second electronic apparatus caches at least one of the at least one modified second file according to a second cache space size of the second storage space.

5. A method for file caching, adapted to a network storage system comprising a first electronic apparatus and a server, wherein the first electronic apparatus has a first storage space, and the server has a network storage space, the method comprising:
when the first electronic apparatus sends an access request to the server for accessing a first file within the network storage space, broadcasting a cache list by the server in response to the access request, wherein the cache list comprises the first file and a plurality of neighboring files neighboring to the first file;

after the first electronic apparatus receives the cache list, accessing the first file according to the cache list by the first electronic apparatus; and caching at least one of the plurality of neighboring files according to a first cache space size of the first storage space by the first electronic apparatus;

wherein after the step of broadcasting the cache list by the server in response to the access request, the method comprises: after a second electronic apparatus receives the cache list, accessing the first file according to the cache list and caching at least one of the plurality of neighboring files according to a second cache space size of a second storage space of the second electronic apparatus by the second electronic apparatus;

wherein after the step of caching at least one of the plurality of neighboring files by the first electronic apparatus according to the first cache space size of the first storage space, the method further comprises: after a user modifies at least one second file of the network storage space using the first electronic apparatus, generating a dirty list according to the at least one modified second file and broadcasting the dirty list by the server; and after the second electronic apparatus receives the dirty list, caching the at least one modified second file according to the dirty list by the second electronic apparatus.

6. The method for file caching according to claim 5, wherein
the plurality of neighboring files and the first file belong to a same directory, a same path and/or a same folder.

7. The method for file caching according to claim 5, wherein
a modification time difference between each of the neighboring files and the first file is less than a predetermined threshold.

8. The method for file caching according to claim 5, wherein the step of caching the at least one modified second file according to the dirty list by the second electronic apparatus comprises: caching at least one of the at least one modified second file according to the second cache space size of the second storage space by the second electronic apparatus.

9. A network storage system, comprising:
a first electronic apparatus, having a first storage space and updating a file usage log according to individual usage of a plurality of files in the first storage space;
a second electronic apparatus, having a second storage space; and
a server, connected with the first electronic apparatus and the second electronic apparatus, having a network storage space which is larger than the first storage space and larger than the second storage space and having a global cache list, wherein
when updating the file usage log, the first electronic apparatus sends a notification message to the server;
after receiving the notification message, the server updates the global cache list and a plurality of server files associated with the file usage log according to the updated file usage log and broadcasts a cache synchronization notification; and after receiving the cache synchronization notification, the second electronic apparatus accesses the global cache list of the server and caches the plurality of server files of the server according to the global cache list;

wherein the file usage log records a plurality of most recently used (MRU) files, and the server adjusts a sorting order of the MRU files in the global cache list according to an individual modified time of each of the MRU files;

wherein the second electronic apparatus preferentially caches the MRU files having priority in the sorting order in the global cache list.

10. The network storage system according to claim 9, wherein
the second electronic apparatus caches a part of the server files in the global cache list according to a cache space size of the second storage space.

11. A method for file caching, adapted to a network storage system comprising a first electronic apparatus, a second electronic apparatus and a server, the method comprising:
updating a file usage log according to individual usage of a plurality of files in the first storage space by the first electronic apparatus;
when the first electronic apparatus updates the file usage log, sending a notification message to the server by the first electronic apparatus;
after the server receives the notification message, updating the global cache list and a plurality of server files associated with the file usage log according to the file usage log and broadcasting a cache synchronization notification by the server; and
after the second electronic apparatus receives the cache synchronization notification, accessing the global cache list of the server and caching the plurality of server files of the server according to the global cache list by the second electronic apparatus;
wherein the file usage log records a plurality of most recently used (MRU) files MRU files, and the step of updating the global cache list according to the updated file usage log by the server comprises: adjusting a sorting order of the MRU files in the global cache list according to an individual modified time of each of the MRU files by the server;
wherein the step of accessing the global cache list of the server and caching the plurality of server files of the server according to the global cache list by the second electronic apparatus comprises: firstly caching the MRU files having priority in the sorting order in the global cache list by the second electronic apparatus.

12. The method for file caching according to claim 11, wherein the step of accessing the global cache list of the server by the and caching the plurality of server files of the server according to the global cache list by the second electronic apparatus comprises:
caching a part of the server files in the global cache list according to a cache space size of the second storage space of the second electronic apparatus by the second electronic apparatus.

* * * * *